April 8, 1930.  A. STIEVENART  1,754,126
APPARATUS FOR SEPARATING DUST FROM GASES
Filed Jan. 28, 1928  2 Sheets-Sheet 1
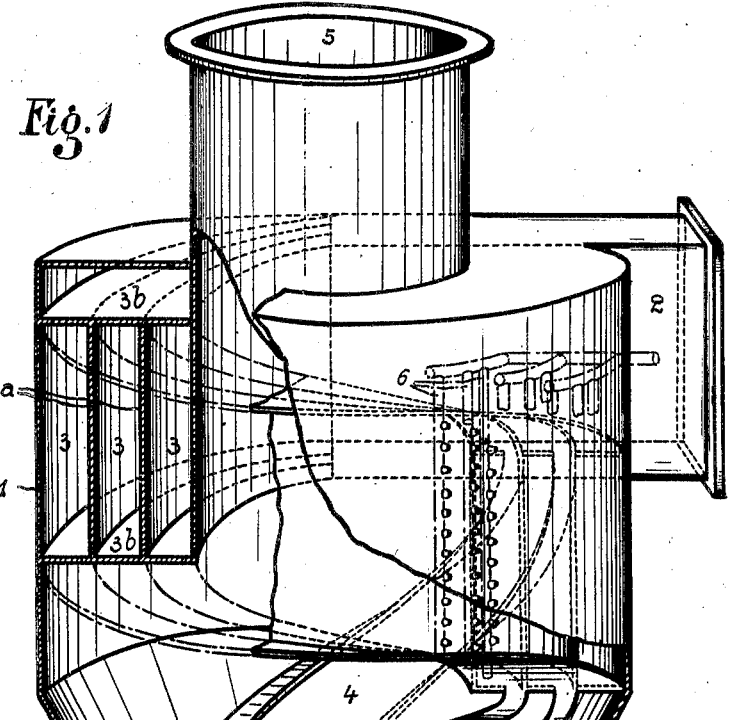
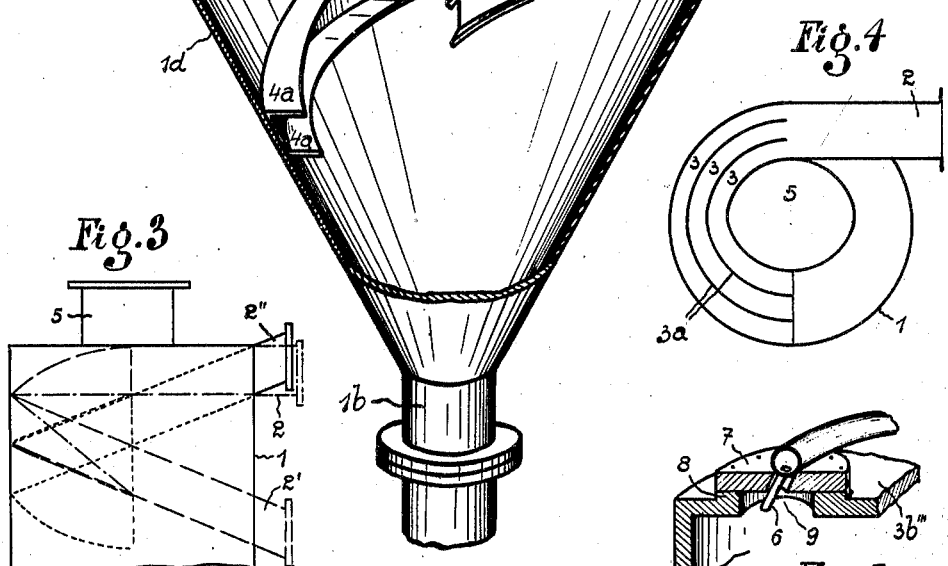
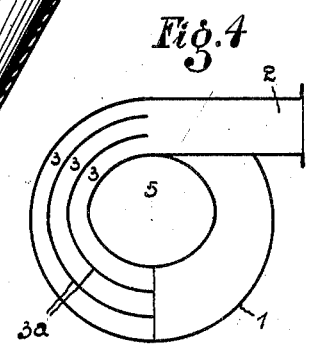
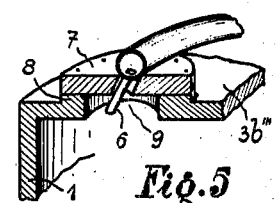

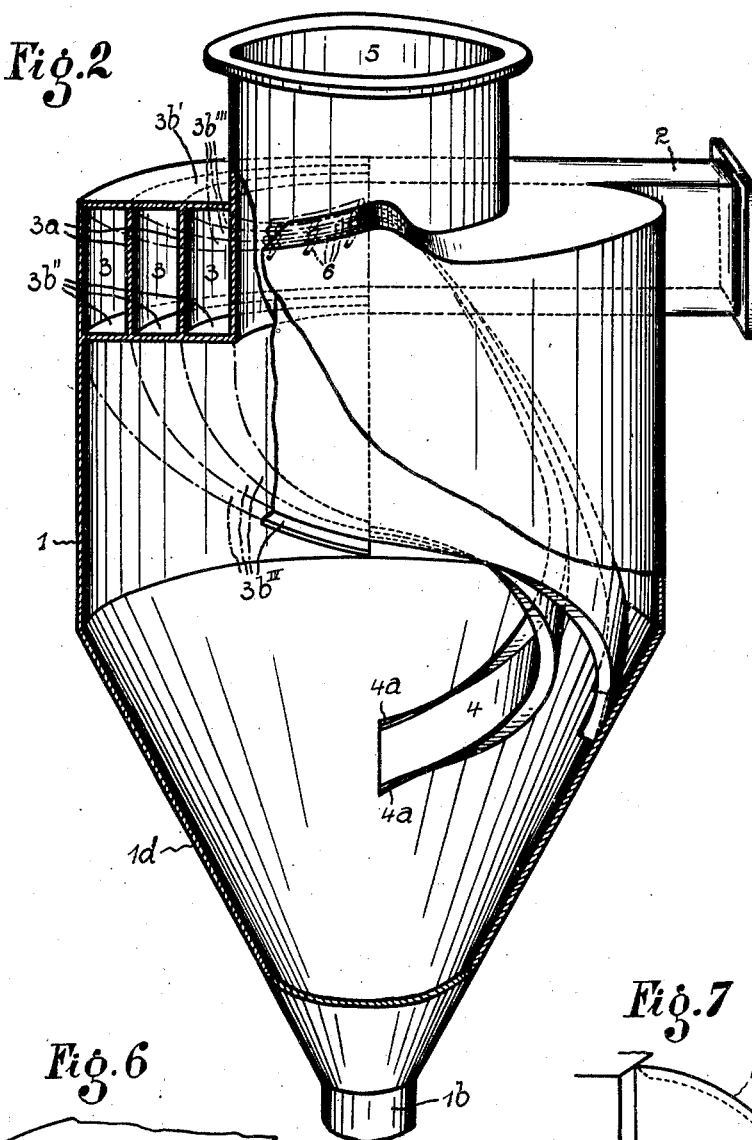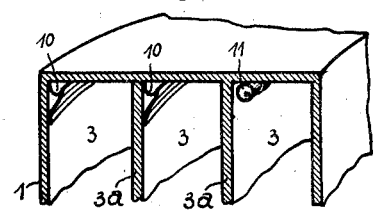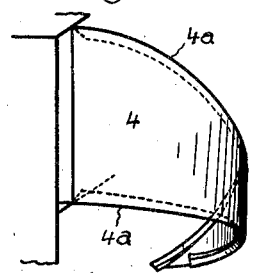

Patented Apr. 8, 1930

1,754,126

UNITED STATES PATENT OFFICE

ARTHUR STIEVENART, OF BOITSFORT, BELGIUM

APPARATUS FOR SEPARATING DUST FROM GASES

Application filed January 28, 1928, Serial No. 250,267, and in Belgium February 4, 1927.

The present invention relates to an apparatus for separating dust, in even the finest particles, contained in a flow of gas, from said gas by centrifugal force.

It relates especially to a dust separating apparatus in which the gases from which dust is to be separated, circulate, in a circuitous course in a certain number of compartments arranged in concentric relation to one another.

In order to prevent the dust which is separated, reaching and contaminating the purified gas leaving each compartment to be drawn up by the chimney, the invention contemplates the provision of means in connection with the compartments to collect and retain the dust.

The invention provides that this retention may be effected by a wet process or by a dry process. In the case when the retention of the dust is effected by a wet process, the invention provides that the damping apparatus be disposed in the said compartments near their exit.

The process is known in which the gas to be deprived of dust is made to pass through a stream of water. But this damping is always realized at the entrance of the gas into the apparatus. This method of operation causes a considerable cooling of the gas, a condensation of vapours, corrosion of the apparatus and of the chimney, and a high consumption of water. These disadvantages are avoided by placing the damping apparatus only near the exits of the compartments.

In case the damping apparatus embodies water jet apparatus acting at the same time as water atomizers or sprayers, the invention provides that these apparatus be placed near the inner wall of each compartment and so that the water be thrown on to the outer wall of these compartments across the whole width of the same.

Further, the invention contemplates disposing the damping apparatus near the top wall, or in special recesses provided in same. The damping apparatus may be arranged so as to operate in a direction the opposite to the flow of gas.

Whether the retention of dust be effected by the wet process or the dry process, the invention provides that each compartment, except the outside compartment, may be provided with a duct which conducts the dust towards a collector, to be discharged.

Whatever may be the method of retaining the dust, the invention also contemplates that the compartments may have a relatively small cross section, so as to increase the velocity of the gas passing through and in consequence to increase the effect of the centrifugal force on the dust particles. The length of said compartments may thus be diminished.

To avoid too great a loss of head in the stream of gas when passing from these compartments to the chimney, of which the cross-section is relatively large compared with that of the compartments, and when the particles separated by centrifugal force are detained by wetting the walls near the exit of the apparatus, to insure, that this damping be effected under favorable conditions, the invention contemplates giving said compartments an increasing cross section near their exit.

The invention provides that the increase in the cross section of the aforesaid compartments near their exit may be realized by increasing their height, by increasing their width, or by increasing simultaneously their height and width.

Other details and novel features of the invention will become apparent from the description of the drawings annexed to the present description, which drawings represent some forms of realization of the invention and in which:

Figure 1 is a perspective view of a dust separating apparatus according to the invention, parts being broken away.

Figure 2 is a view similar to Figure 1 of another form of apparatus according to the invention.

Figure 3 represents schematically, in elevation various means of admitting the gas to a dust separating apparatus according to the invention.

Figure 4 is a schematic view on a reduced scale through the different compartments of the apparatus according to Figure 2.

Figure 5 is a fragmentary, sectional perspective view of a particular arrangement of the water injection pipes.

Figure 6 is a fragmentary perspective view of a particular means for the dampening of the outer walls of the compartments.

Figure 7 is a perspective view of a modified form of duct disposed at the exits of the compartments of the apparatus, in the embodiment where the dust separated by centrifugal force is retained by damping.

In these different figures like reference characters refer to like parts.

Figure 1 shows that the gas to be freed of dust is admitted to the apparatus by the duct 2 opening at the top into concentric compartments 3 bounded by walls $3^a$ concentric to the outside casing 1 of the apparatus and by helically extending top and bottom walls $3^b$.

The dust separated by centrifugal force adheres to the outer walls of the compartments 3. The invention contemplates that the dust leaving the compartments 3 which do not touch the outside casing wall 1 of the apparatus, is conducted by ducts 4 against the surface of the lower conical part $1^d$ which constitutes a collecting hopper for a discharge pipe $1^b$. To allow the gas, circulating in the outer compartments, to easily reach a chimney 5 for the discharge of the gas present in the center of the apparatus, the invention contemplates that the height of the ducts 4 diminishes gradually as these ducts are further from the exit of the compartments 3.

The gas from which the dust has been separated circulates in the ducts 4 and can escape rapidly towards the chimney 5 because these ducts 4 are open at their inner sides. Further, in order that the ducts 4 may serve effectively to guide the dust separated by centrifugal force towards the exit ends of these ducts and against the hopper $1^d$, the invention contemplates forming the side flanges $4^a$ of a width which increases gradually as the height decreases.

By the arrangement described above, the dust separated by centrifugal force is kept separated from the gas exhausted by the chimney and can be completely discharged by the pipe $1^b$, without being again drawn into the chimney 5, is contrast with what happens in the usual dust separators.

In case, the retention of the dust, instead of being effected by the dry process as described above, is effected by wetting the outer walls of the compartments 3, the invention provides water spray pipes 6 (shown in dotted and full lines), disposed at the exit of each compartment preferably against the inner wall thereof, so that the water jets are projected across each compartment for its entire width before reaching the outer wall of the corresponding compartment to which the dust separated by centrifugal force is adhering. These spray pipes act preferably at the same time as water atomizers. These spray pipes for atomized water, which may eventually extend through the entire height of the compartments 3, have the advantage of depositing on these walls the lightest dust which might still be suspended in the stream of gas. Besides, they increase the mass of this dust by a moistening effect and thus accentuate the effect of the centrifugal force to which they are subjected.

The ducts 4 the presence of which is necessary when the retention of the dust takes place by the dry process, may also be employed when the retention takes place by the wet process, whether this wetting is done by jets of atomized water or by it simply trickling down the outer walls of each duct.

In the apparatus shown in Figure 2, the total cross section of the compartments 3 is relatively small at their entrance compared with the cross section of the chimney 5 for discharging the gas as shown by broken lines in the said figure. The result is that for a given volume delivery of gas, the velocity of this gas in the compartments 3 is relatively high, which increases the effect of the dust separation by centrifugal force. This arrangement allows the length of the compartments 3 to be reduced with an equal separating effect.

To avoid too much loss of head in the passage of the gas from the compartments 3 to the chimney 5 and, when the particles separated by centrifugal force are detained by wetting of the walls, near the exit of the compartments, to permit of this wetting taking place under favorable conditions, the invention contemplates that the cross section of these compartments should be increased towards the exit ends of same. Thus the erosive action of the solid particles surrounded by water only occurs over a very small area and with a relatively low velocity of the gas which so diminishes the action as well as the deviation of the water by the gas to be purified as to be negligible. The result is, that the part of the apparatus subjected to the action of the water may be made shorter as well as of lighter build.

In the case in question, the cross section of the compartments 3 is bounded in height, for the portion of their length with a small cross section, by a flat top wall $3^{b'}$, and a bottom wall $3^{b''}$ parallel to the top wall $3^{b'}$; and for the portion of their length with an increasing cross section by a top wall in the shape of an helicoidal surface with directing plane $3^{b'''}$ situated above the wall $3^{b'}$ and by a bottom wall having a helicoidal surface with a directing plane $3^{bIV}$ situated below the floor $3^{b''}$. It is evident that the variation in the height of the compartments could also be obtained by making only the bottom wall or the top wall in the shape of a helicoidal surface with the directing plane or other similar surface, and by leaving the opposite wall in the same plane as for the part with a small cross section.

The cross section of the compartment 3 is limited in width by the walls 3ª shown schematically in Fig. 4, for the portion of their length with a small cross section by arranging the walls of the compartments concentric to one another and, for the portion with an increasing cross section by arranging the walls, throughout this portion, in spiral form and with different degrees of curvature, whereby they are spaced apart gradually increasing distances towards the exit ends of the compartments.

The increase in cross section of the compartments obtained in the case in question by increasing the height and the width of these compartments could also be obtained by increasing only the height or the width.

Further, the invention contemplates that, if desired, the damping apparatus at the exit of the compartments 3 be placed against the top wall, or, preferably, in special recesses provided for this purpose in the top wall of the compartments. In the case illustrated, this apparatus, consists of water spray nozzles 6, and preferably at the same time water atomizing nozzles placed near the inner wall of each compartment and directed downwards and towards the outer wall of these compartments as in the embodiment of the invention shown in Fig. 1.

Further, the invention contemplates directing these nozzle obliquely, in the opposite direction to the stream of gas, so as to increase the efficiency of the injection and diminish the area of the part of the apparatus exposed to the action of the water. The arrangement of the nozzles in the top wall of the compartments 3 has the advantage of causing these nozzles to act in a location where the gas accumulates principally, owing to its low density, and the suction of the chimney. Further, these nozzles are better protected from the action of the solid particles and the liquid particles issuing from the previously described nozzles, which reduces the wear and tear on these nozzles.

The wear and tear on the nozzles is especially reduced when these nozzles are located in recesses as shown in Fig. 5 and which are referred to above. This Fig. 5 shows a nozzle 6 mounted in a plate 7 fixed in any convenient manner on a rim 8 of the top wall. This nozzle, inclined as described above, is of such a length that it does not extend beyond the recess 9.

Instead of the nozzles 6, other damping apparatus for the walls of the compartments 3 may be used. Thus for instance the nozzles 6 may be replaced by conduits 10, shown in Fig. 6 and from which the water overflows and wets the outer walls of each compartment by trickling down.

The wetting of these walls may also be effected by placing along their upper part, water distributing pipes 11, also shown in Fig. 6, said pipes being formed with perforations through which the water passes to reach the above mentioned walls.

In the apparatus shown in Figs. 1 and 2, the entrance of the gas takes place horizontally. It is evident that this entrance could take place by a duct 2 directed obliquely upwards or downwards (positions 2' and 2'' in Fig. 3).

Whatever be the slope of the compartments and the manner in which their cross section is increased, they may be terminated by ducts 4 which conduct the dust wetted or not, towards the lower conical part $1^d$ of the apparatus, which serves as collecting hopper for the discharge pipe $1^b$.

In the case where the dust separated by centrifugal force is retained by damping, it may happen that the dust particles are sufficiently moistened or coated with water to be no longer drawn towards the chimney even before they have reached the end of said ducts 4 above mentioned.

In this case, the invention provides that the ducts 4 shall only have a length at the end of which it is estimated that the dust particles will be coated with water. This is shown in Fig. 7 where a duct 4 is seen, the height of which decreases rapidly towards the end so that if developed, the side wall is represented by a triangle. The walls $4^a$ of this duct make preferably an acute angle with the side wall 4. The bottom wall is cut off before the end of the duct, so as to allow the discharge of the mud accumulated during the operation through the bottom, whereas the gas is drawn upwards. This mud thus falls into the hopper $1^d$. The discharge of the mud may also be facilitated by cutting off the upper wall of the duct inwardly of the discharge end of the duct as shown in a broken line. The bottom wall may in this case be continued to the discharge end of the duct.

It is evident that the invention is not limited exclusively to the forms shown and that many alterations may be made in the shape, the arrangement and the construction of the parts constituting the invention within the scope of the claims.

For instance, the total cross section, the number and the width of the compartments may be fixed in each special case depending on the volume of gas to be purified and on the size and the density of the particles. Owing to a methodic combination of the principles of separation by centrifugal force and of damping, this apparatus provides great efficiency in the smallest possible space.

Finally, it can be included in an existing installation without necessitating any essential alteration.

It is also evident, that by altering some of the constructional details, the stream of gas might be directed from below in an upward direction, or follow a horizontal or inclined path. Also the concentric compartments may be extended and even exceed a complete circumference, so as to cause the streams of gas to follow a more or less lengthy path for separation by centrifugal force.

The number of the ducts 4, their cross section and other details may be varied if desired.

What I claim is:

1. Apparatus for separating dust from gases by centrifugal force, comprising compartments for conducting the gas and arranged to effect circuitous travel thereof, an outlet towards which the gas passes after leaving the compartments, a receiver for the separated matter delivered from the discharge ends of the compartments, and dampening units upon the walls of the compartments disposed adjacent the ends of the compartments and arranged wholly within recesses provided in the top walls of the compartments.

2. Apparatus for separating dust from gases by centrifugal force, comprising compartments for conducting the gas and arranged to effect circuitous travel thereof, an outlet toward which the gas passes after leaving the compartments, a receiver for the separated matter delivered from the discharge ends of the compartments, and dampening units upon the walls of the compartments and disposed adjacent the ends of the compartments and directed to deliver jets of atomized dampening fluid against the flow of gas.

3. Apparatus for separating dust from gases by centrifugal force, comprising concentrically arranged compartments for conducting gas, and arranged to effect circuitous travel thereof, an outlet toward which the gas passes after leaving the compartments, a receiver for the separated matter delivered from the discharge ends of the compartments, a plurality of ducts extending toward the said receiver, one said duct being disposed at the delivery end of each compartment except the outer compartment.

4. Apparatus for separating dust from gases by centrifugal force, comprising concentrically arranged compartments for conducting the gas, and arranged to effect circuitous travel thereof, an outlet towards which the gas passes after leaving the compartments, a receiver for the separated matter delivered from the discharge ends of the compartments, a plurality of ducts open at their inner sides and extending to the wall of the said receiver, one said duct being disposed at the delivery end of each compartment except the outer compartment.

5. Apparatus for separating dust from gases by centrifugal force, comprising concentrically arranged compartments for conducting the gas and arranged to effect circuitous travel of the gas, an outlet towards which the gas passes after leaving the compartments, a receiver for the separated matter, delivered from the discharge ends of the compartments, means for dampening the walls of each compartment disposed adjacent the ends of the compartments, a plurality of short ducts open at their inner sides and extending to the wall of the said receiver, one said duct being disposed at the end of each compartment except the outer compartment.

6. Apparatus for separating dust from gases by centrifugal force, comprising concentrically arranged compartments for conducting the gas and arranged to effect circuitous travel of the gas, an outlet towards which the gas passes after leaving the compartments, a receiver for the separated matter delivered from the discharge ends of the compartments, a plurality of ducts of decreasing height open at their inner sides and extending to the wall of the said receiver, one said duct being disposed at the end of each compartment except the outer compartment.

7. Apparatus for separating dust from gases by centrifugal force, comprising concentrically arranged compartments for conducting the gas and arranged to effect circuitous travel of the gas, an outlet towards which the gas passes after leaving the compartments, a receiver for the separated matter delivered from the discharge ends of the compartments, a plurality of ducts of decreasing height and increasing width open at their inner sides and extending to the wall of the said receiver, one said duct being disposed at the end of each compartment except the outer compartment.

8. Apparatus for separating dust from gases by centrifugal force, comprising concentrically arranged compartments for conducting the gas and arranged to effect circuitous travel of the gas, an outlet towards which the gas passes after leaving the compartments, a receiver for the separated matter delivered from the discharge ends of the compartments, the said compartments being of increasing cross section near their discharge ends, and dampening units upon the walls of the compartments disposed at the exit ends of these compartments.

9. Apparatus for separating dust from gases by centrifugal force, comprising concentrically arranged compartments for conducting the gas and arranged to effect circuitous travel of the gas, an outlet towards which the gas passes after leaving the compartments, a receiver for the separated matter delivered from the discharge ends of the compartments, the said compartments being of increasing height near their exit.

10. Apparatus for separating dust from gases by centrifugal force, comprising concentrically arranged compartments for conducting the gas and arranged to effect circuitous travel of the gas, an outlet towards which the gas passes after leaving the compartments, a receiver for the separated matter delivered from the discharge ends of the compartments, the said compartments being of increasing height, near their exit and this increasing height being obtained by arranging the top walls of the compartments, in the length portion of increasing height, in diverging relation to the bottom walls of the portion of the compartments which have a small cross section.

11. Apparatus for separating dust from gases by centrifugal force, comprising concentrically arranged compartments for conducting the gas and arranged to effect circuitous travel of the gas, an outlet towards which the gas passes after leaving the compartments, a receiver for the separated matter delivered from the discharge ends of the compartments, the said compartments being of increasing height, near their exit and this increasing height being obtained by arranging the bottom walls of the compartments, in the length portion of increasing height in diverging relation to the top walls of the portions of the compartments which have a small cross section.

In testimony whereof I affix my signature.

ARTHUR STIEVENART.